Dec. 30, 1924.
D. A. REED
1,521,321
AUTOMOBILE HEADLIGHT SCREEN
Filed March 3, 1924
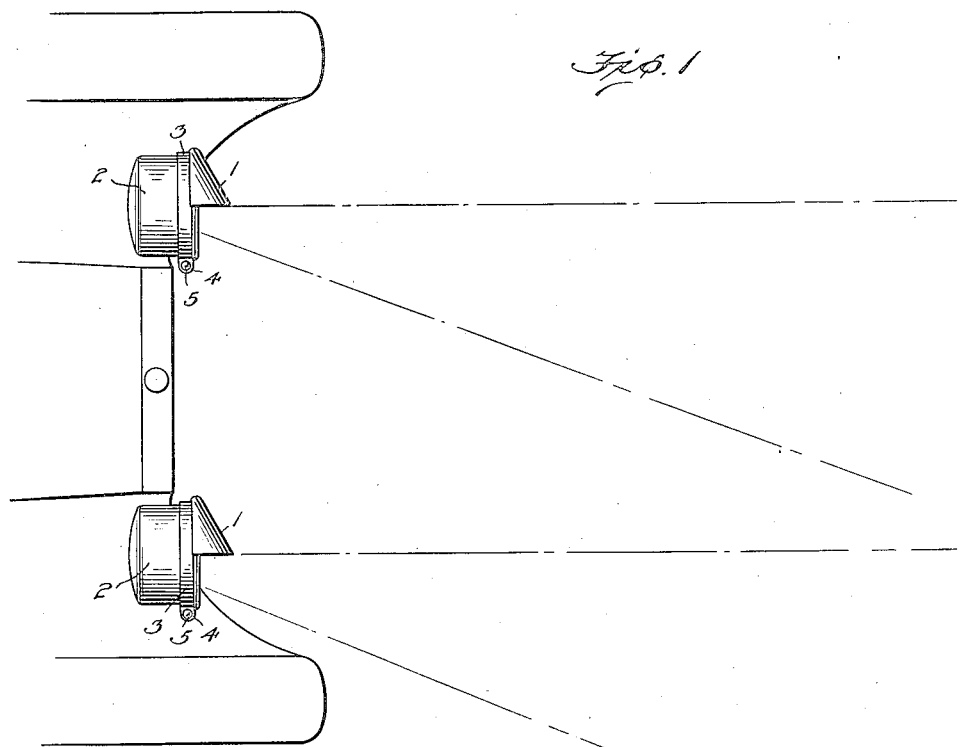
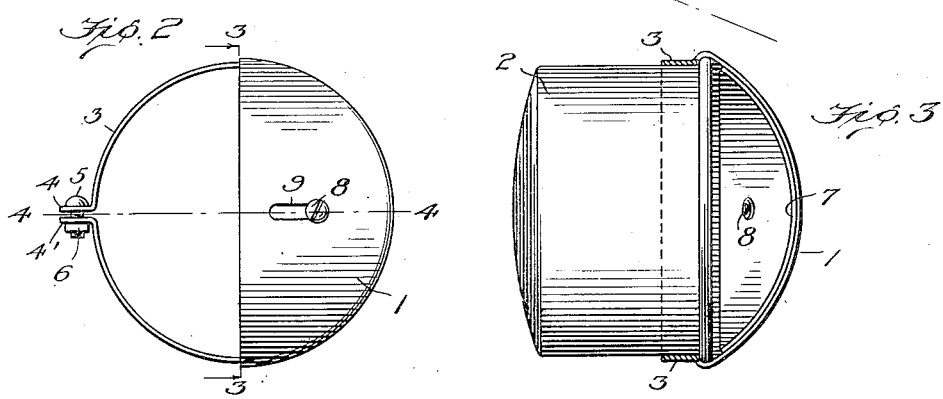
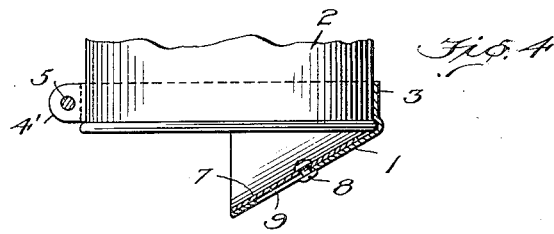

Patented Dec. 30, 1924.

1,521,321

UNITED STATES PATENT OFFICE.

DANIEL A. REED, OF DUNKIRK, NEW YORK.

AUTOMOBILE HEADLIGHT SCREEN.

Application filed March 3, 1924. Serial No. 696,553.

*To all whom it may concern:*

Be it known that I, DANIEL A. REED, a citizen of the United States, residing at Dunkirk, in the county of Chautauqua and State of New York, have invented certain new and useful Improvements in Automobile Headlight Screens, of which the following is a specification.

My invention relates to improvements which are intended for use on headlights of automobiles and other motor driven vehicles where a powerful light is thrown in one direction by means of a reflector.

In the use of automobile headlights as now commonly constructed, as two cars equipped therewith approach each other in passing, there is a glare from the headlights of each, which affects the vision of the driver of the other car, thereby creating a danger zone at the point of passing, both the drivers of vehicles and pedestrians alike.

The object of my invention is to eliminate this danger zone by providing an attachment or cooperative element for automobile headlights by means of which the beams of light from the reflector may be limited to a fixed and restricted area of projection, whereby the glare ordinarily projected into the vision of the driver of an approaching car is eliminated, without reducing the effectiveness of the headlight for road illumination.

A further object of this invention is to so construct the co-operative element that it may readily be attached to any of the headlight casings now in common use, without a resort to special tools or skill.

The invention consists in the details of construction and the arrangement of the parts hereinafter more fully described and particularly pointed out in the claim.

In the accompanying drawings forming part of this specification:

Fig. 1, is a plan view of the front end of an automobile equipped with my invention.

Fig. 2, is a front elevation.

Fig. 3, is a sectional view taken on the line 3—3 of Fig. 2.

Fig. 4, is a sectional view taken on the line 4—4 of Fig. 2.

It will be understood that I do not limit myself to the specific form of device shown in the drawings, as I may employ other forms to carry out the spirit of my invention. In the preferred embodiment in carrying out my invention, I provide a semi-conical or equivalent shade 1, which is adapted to be attached to any of the common forms of headlight housings or casings now in use, and for the purpose of illustration I show a barrel type of casing 2 upon which the shade 1 may be detachably mounted by matching the casing barrel 2 with the constricting band 3 formed integral with the shade 1.

The constricting band 3 is formed by bringing the ends into contiguous relation in the form of right angle projecting lugs 4—4'. These lugs 4—4' are apertured to receive the bolt 5, upon which is screw threaded the nut 6, adapted to be set up to constrict the band 3 around the casing barrel 2 in a manner well known in the art.

When properly positioned upon the casing barrel of the headlight, the shade 1 will obscure a vertical section of the light lens and cut off the beams of light on one side of a medial line from the centre of the light source within the casing, to the vertically disposed outer edge of the shade 1. For the purposes intended in the adaptation of the shade 1 to the light, it is so positioned that it will allow the beams of light to project only on the right side of the medial line described and thereby to obscure the beams of light on the opposite side that would otherwise project upon that portion of the highway being traversed by an approaching automobile in passing.

It will be apparent to those skilled in the art that with the application of my invention to both of the headlights usually mounted on an automobile, that the surface of the high way in advance of, and over which the wheels of an approaching automobile will engage, will be amply illuminated as the automobile is steered in a direct line with the highway, or in a line concentric with curves in the road. When the course of the automobile is altered, as in being diverged to the right in passing an approaching car, the restricted area of light projection will be likewise diverged to the right, thereby accomplishing the dual effect of removing the glare from the vision of the driver of the approaching car, and also that of causing an increased illumination in the danger zone existing at the point of initial passing of meeting automobiles, and also upon the side path of the road usually traversed by pedestrians.

In the adaptability of my cooperating screen element to the usual form of headlight casings now in use, it will be found that the object sought will be accomplished by the bi-secting of the light beams in a central vertical line.

For the purpose of making my invention more universal in its application to headlights of varying shapes, and to others having different reflecting mediums, I provide for adjusting horizontally the vertical bisecting line of the screen so as to adopt the screening means to limit the projecting light beams to the restricted area of illumination desired.

I accomplish this object by placing on the inside of the conical wall of the screen 1, and concentric therewith, a movable visor 7 adapted to be extended or retracted in relation to the vertically disposed outer edge of the shade 1. To maintain the visor 7 in the fixed position required to properly bisect the light beams for any given headlight, there is provided the clamping screw 8 residing in the elongated slot 9 formed in the conical face of the shade 1 and projecting through an aperture in the visor 7 with a nut screw threaded on the inner end of the screw 8, a form of clamping means well known in the art.

It will be apparent to those skilled in the art that changes may be made in the general form and arrangement of the parts described without departing from my invention and hence I would have it understood that I do not restrict myself to the precise details set forth but consider myself at liberty to make such slight changes and alterations as fairly fall within the spirit and scope of my invention.

Having fully described my invention, what I claim as new, and desire to secure by Letters Patent is:

The combination with a plurality of headlights for a motor car, and each including a casing, of a screen affixed to the side of each casing and extending in a horizontal direction across the casing and across the projected beam of light, and scoop-shaped extension elements connected with the screens and movable in the same direction beyond the edges of the screens, horizontally across the light beam, the extension elements being slidable to position their outer edges in vertical planes at different distances from lines bisecting the casings vertically, for directing the rays from one headlight chiefly toward the right side of the roadway and those of the other headlight chiefly in the direct path of travel.

In testimony whereof I affix my signature.

DANIEL A. REED.